United States Patent [19]

Schröder

[11] Patent Number: 5,096,355
[45] Date of Patent: Mar. 17, 1992

[54] HIGH BAY RACKING STORE FOR STORING AND FOR REMOVING FROM STORAGE GOODS IN THE FORM OF ROLLS, IN A PARTICULAR PAPER ROLLS

[75] Inventor: Niels Schröder, Pinneberg, Fed. Rep. of Germany

[73] Assignee: COPLA Förder-und Lagertechnik Gesellschaft für Anlagenbau mbH, Berlin, Fed. Rep. of Germany

[21] Appl. No.: 517,377

[22] Filed: May 1, 1990

[30] Foreign Application Priority Data

May 2, 1989 [DE] Fed. Rep. of Germany ... 8905526[U]

[51] Int. Cl.⁵ .............................................. B65G 1/04
[52] U.S. Cl. .................... 414/273; 414/277; 414/911; 364/487
[58] Field of Search ............... 414/745.6, 746.6, 746.8, 414/268, 273, 275, 277, 279, 281, 284, 911, 908; 364/478

[56] References Cited

U.S. PATENT DOCUMENTS

| | | | |
|---|---|---|---|
| 3,675,915 | 7/1972 | Vigus | 414/746.8 X |
| 3,746,189 | 7/1973 | Burch et al. | 414/284 X |
| 3,817,406 | 6/1974 | Sawada et al. | 414/279 |
| 3,880,299 | 4/1975 | Zollinger et al. | 414/279 X |
| 3,973,685 | 8/1976 | Loomer | 414/284 X |
| 4,268,207 | 5/1981 | Pipes | 414/277 |
| 4,459,078 | 7/1984 | Chiantella et al. | 414/279 |

FOREIGN PATENT DOCUMENTS 167774  3/1965  U.S.S.R. .............................. 414/908

*Primary Examiner*—Frank E. Werner
*Assistant Examiner*—Brian K. Dinicola
*Attorney, Agent, or Firm*—Toren, McGeady & Associates

[57] ABSTRACT

For the conveying and storing of paper rolls in a lying position in a high bay racking store and for removing them from the same, the high bay racking store (10) is provided with a plurality of shelf compartments disposed in rows above each other and in side-by-side arrangement, to which the individual paper rolls are supplied by means of relocation cars (50) and a paper roll trolley (70) mounted on the latter and traveling transversely to the longitudinal direction of the relocation car, in which the paper roll trolley (70) is moved with the paper roll in a raised position into the shelf compartment between paper roll supports (80) extending in the longitudinal direction of the shelf, the paper roll being subsequently deposited on said support. The supply of the relocation cars (50) with the paper roll trolley (70) is effected with the aid of conveying tracks (40 thru 43) allocated to the individual shelf compartment tiers and by means of at least one elevator (60), the elevator well (60′) of which is disposed stationarily or displaceably in the distribution well (30) formed between the two shelf portions of the high bay racking store (10) which are located opposite each other (FIG. 3).

14 Claims, 10 Drawing Sheets

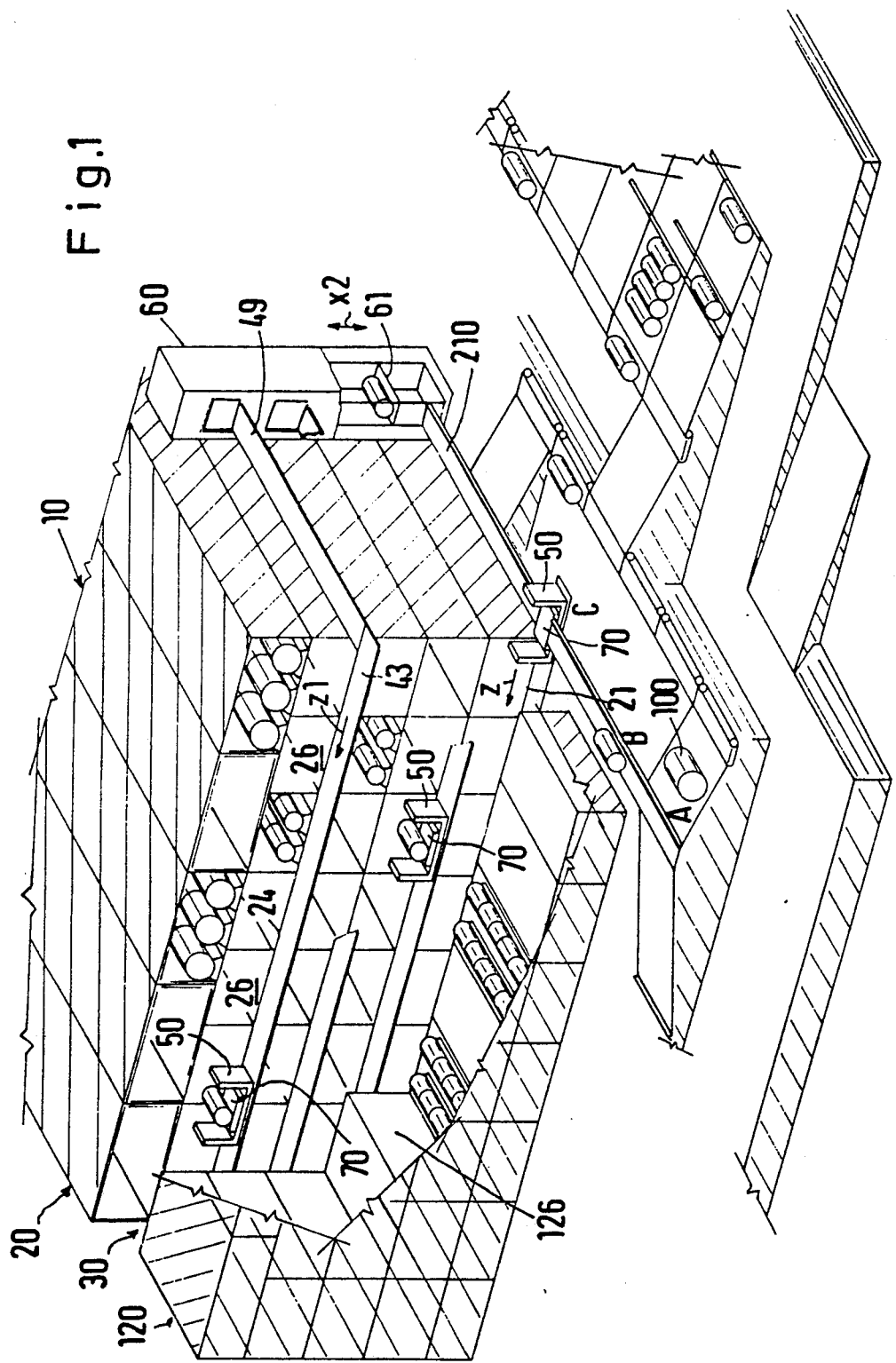

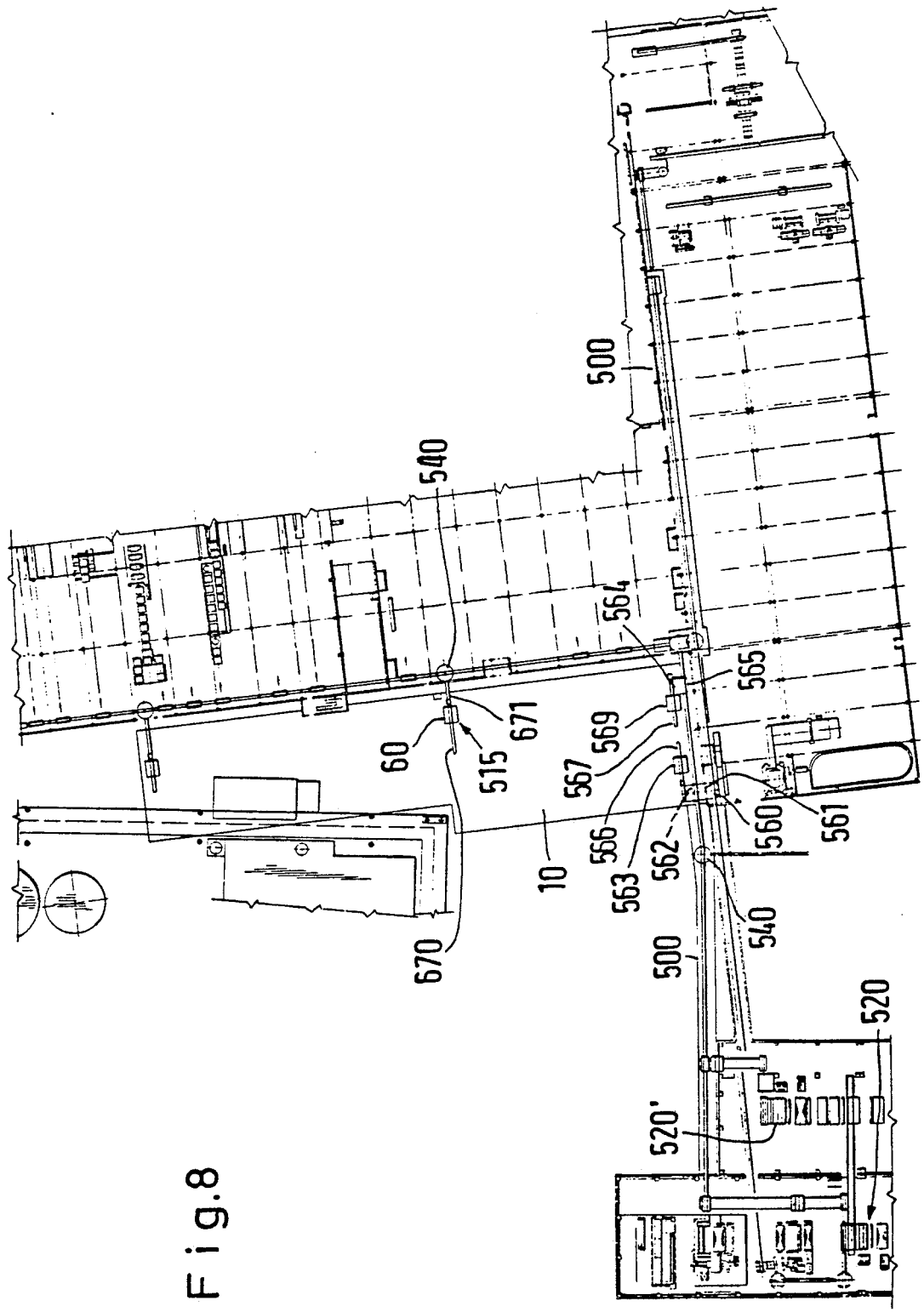

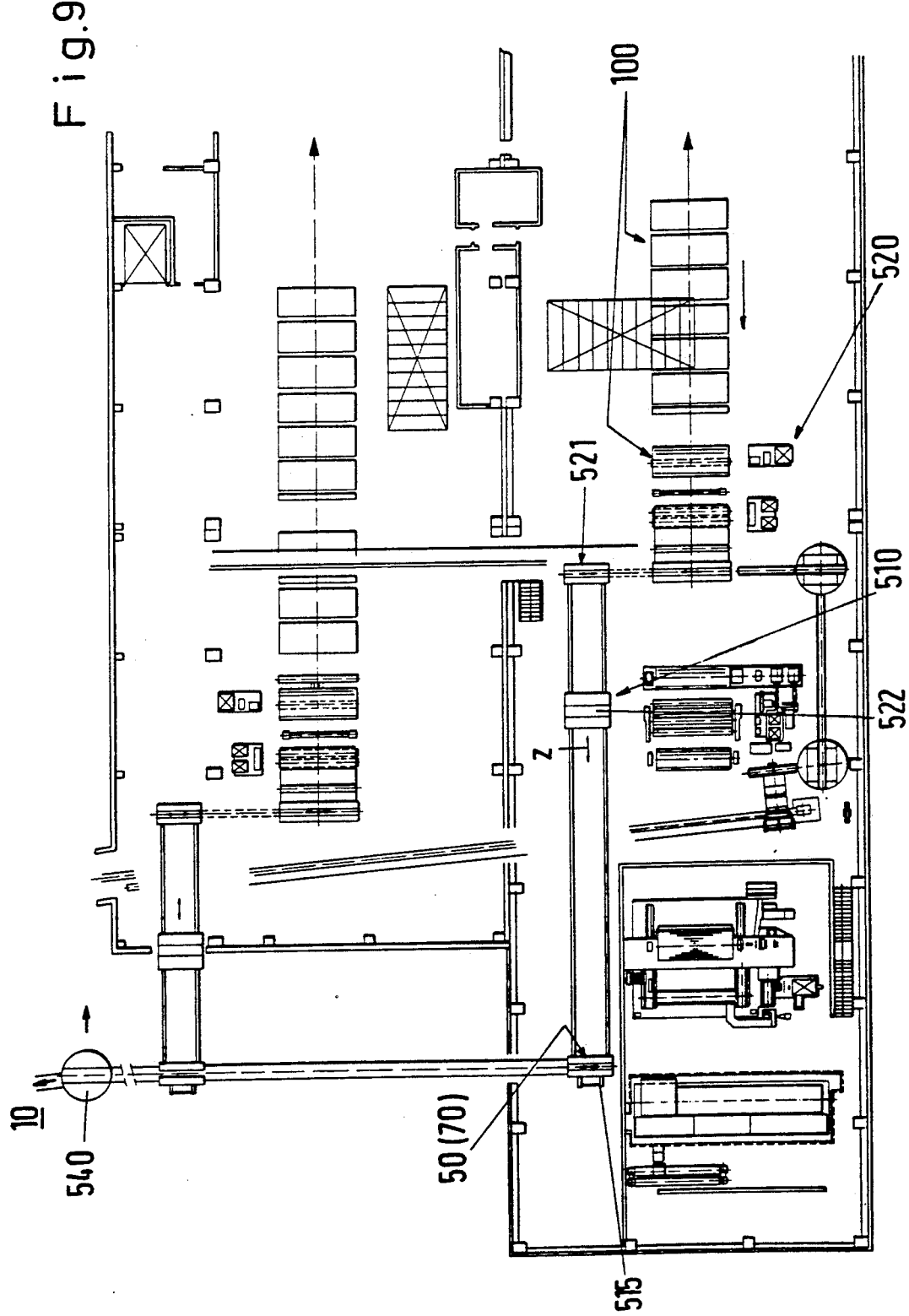

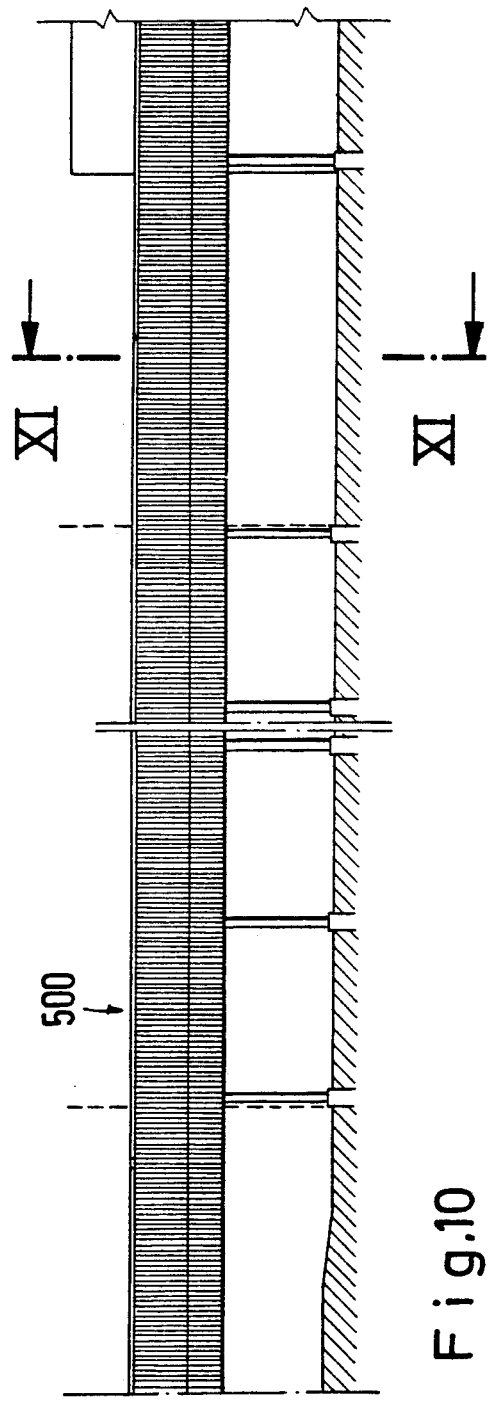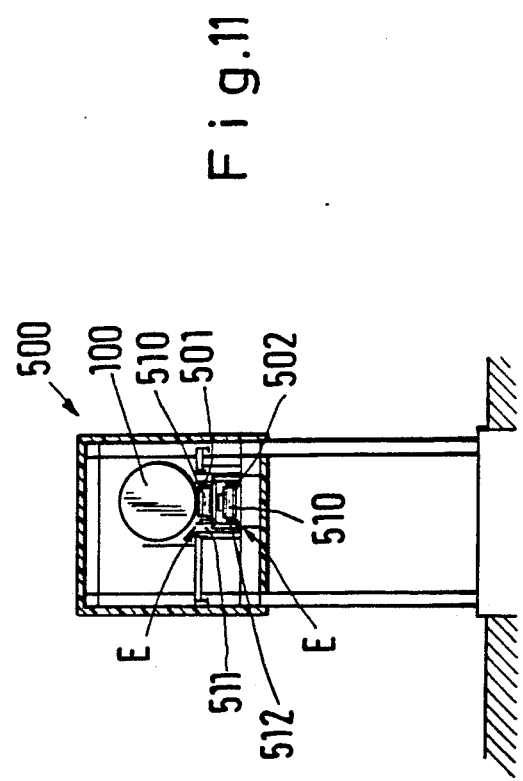

HIGH BAY RACKING STORE FOR STORING AND FOR REMOVING FROM STORAGE GOODS IN THE FORM OF ROLLS, IN A PARTICULAR PAPER ROLLS

BACKGROUND OF THE INVENTION

The present invention relates to a high bay racking store for storing and for removing from storage rolls of goods, more particularly paper rolls, which, in a lying position, can be supplied by a roll packing means via a conveying track to the high bay racking store with shelf compartments.

Two storage techniques are known for the storing of paper rolls, viz. a stacker store and a crane store. In the stacker store, the paper rolls are aligned with the packaging or cutting machine and are lifted up by the stacker with the aid of a clamping means. With the aid of the stacker the paper roll is then conveyed to the storage site, at which mostly several paper rolls are stacked on top of each other in a tower-like manner. In this kind of storage technique, a damaging of the paper rolls by the clamping means employed cannot be avoided. A further danger of damage exists due to the paper rolls being put down obliquely so that their edge areas may be damaged. The tower-like stacking on top of each other of several paper rolls is also conducive to accidents. In the crane store, the paper rolls are likewise aligned with the packaging or cutting machine and they are picked up with the aid of a crane system with a vacuum lifter. The crane system moves the individual paper rolls to the storage site, at which the paper rolls are then likewise stacked upon each other in a tower-like fashion. Owing to a tilting of the paper rolls due to the nature of the store, an increased risk of damage exists here as well.

Since the loading of freight cars and trucks with paper rolls is always carried out while the rolls assume a horizontal position, the above-mentioned conventional storage systems always have to comprise a standing on end and a tipping over of the paper rolls for the performance of their functions.

The invention is based upon the technical problem of providing a high bay racking store for storing paper rolls and for removing the rolls from storage, to which store the paper rolls can be delivered in a horizontal, i.e. lying position, in which they can be accommodated in a horizontal position and can be removed from the high bay racking store in the lying position in order to thus render possible a mode of conveying and storing ring the rolls in a lying position so that the paper rolls are moved in the gentlest manner possible.

This technical problem is solved by the combination of features indicated in claim 1.

SUMMARY OF THE INVENTION

Such a high bay racking store constructed pursuant to the invention renders possible the conveying and storing of paper rolls in a lying position. Thus, uprighting of the paper rolls in order to bring these into a vertical position is avoided and no longer necessary. The paper rolls supplied with the aid of suitable conveying means are delivered to the individual shelf compartments in a lying position and are also stored in a lying position in the individual shelf compartments, while the removal of the paper rolls and the transporting away of the paper rolls is also effected with the paper rolls in the lying position. The advantage resulting from from the use of a high bay racking store constructed in this manner resides in that the paper rolls which reach the store in a lying position from the roll packing machine via a conveying track, are received there also in a lying manner, are conveyed within the store and are either stored or removed from the store and are passed on to the store exit area likewise in a lying manner. This mode of conveying and storing the rolls in a lying position offers the decisive advantage that the paper rolls are moved in a gentle manner. To this is added the circumstance that, with the high bay racking store, a compact, space-saving storage of paper rolls is possible; the storage operation is performed automatically and a gentle handling of the paper rolls is provided. A further advantage consists in that the storing and the removing from storage of the paper rolls is effected without auxiliary means such as pallets or the like. The acceptance of each individually arriving paper roll takes place with the paper roll in a lying position and in the way in which the paper roll emerges from the packing, due to which a tipping and uprighting of the roll is no longer necessary. On account of the construction of the high bay racking store in the form of shelf compartments, it is possible for paper rolls having different diameters and widths to be stored one behind the other. Since loading units of up to 3100 mm in length can be stored or removed from storage with a load alternation, a very high performance is possible. By employing e.g. eighteen relocation cars with one paper roll trolley each, it is possible for 160 paper rolls to be stored without any difficulty, or for 260 paper rolls to be removed from the store per hour. Instead of the known shelf conveyers and vehicles running across the entire store height, small relocation cars with paper roll trolleys mounted on them which can be installed at every store level and which are constructed solely for horizontal travel and load lifting or load removal, take care of the store operation. The use of a larger number of vehicles renders a high handling performance possible. It is possible to effect storing and store-removing operations parallelly. A sectional store construction incorporated into the shelf compartments can serve as an auxiliary store means. To this is added the circumstance that the store concept provided by the high bay racking store is a so-called "chaotic store", since it is possible to store paper rolls having any roll diameter and every roll width in every store shelf or store passage.

Advantageous constructions of the invention are characterized in the subclaims.

BRIEF DESCRIPTION OF THE DRAWINGS

Embodiments of the invention are explained in the following with the aid of the drawings. Thus FIG. 1 shows, in a diagrammatical schematic view, a high bay racking store comprising two shelf portions, one shelf portion being depicted in section only, FIG. 8 shows an overall view of the high bay racking store with supply tracks for the paper rolls inserted in front of the same, FIG. 9 shows an overall view of the high bay racking store with supply tracks and paper roll cutting means, FIG. 10 shows, in a side view, a conveyer bridge for supplying the paper rolls to the high bay racking store, and FIG. 11 shows a vertical section in the direction of Line XI—XI in FIG. 10.

DETAILED DESCRIPTION OF THE PREFERRED EMBODIMENT

Figure 2A:
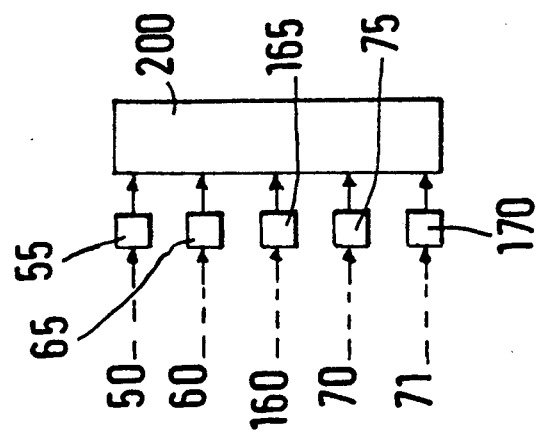
FIG. 2 shows, in a view from the top, the high bay racking store according to FIG. 1 comprising two shelf portions disposed on both sides of a distribution well.
Figure 2:
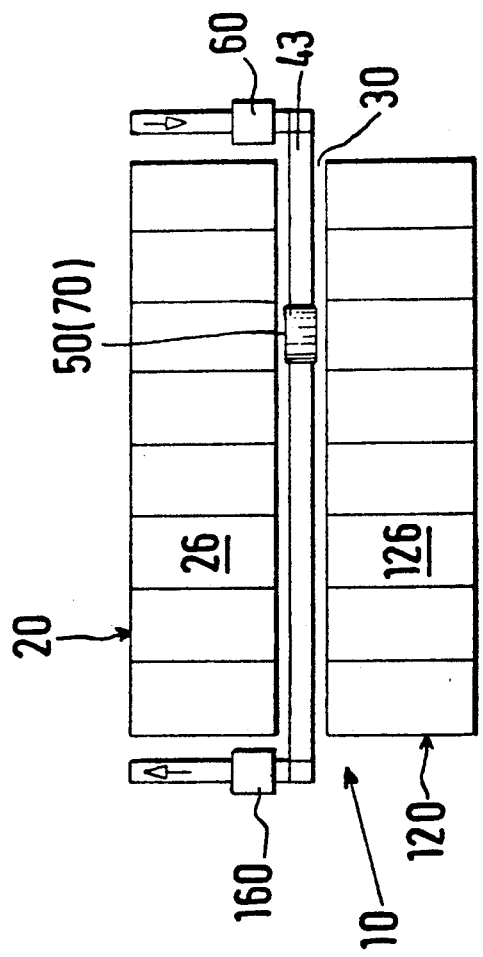

The high bay racking store depicted in FIGS. 1 and 2 and identified with 10 for storing and for removing from storage goods in the form of rolls, more particularly paper rolls 100, comprises two shelf portions 20,120 which, while forming a distribution well 30, are disposed so as to be located opposite each other, while the width of the distribution well 30 corresponds approximately to the length of a paper roll 100.

Figure 5:
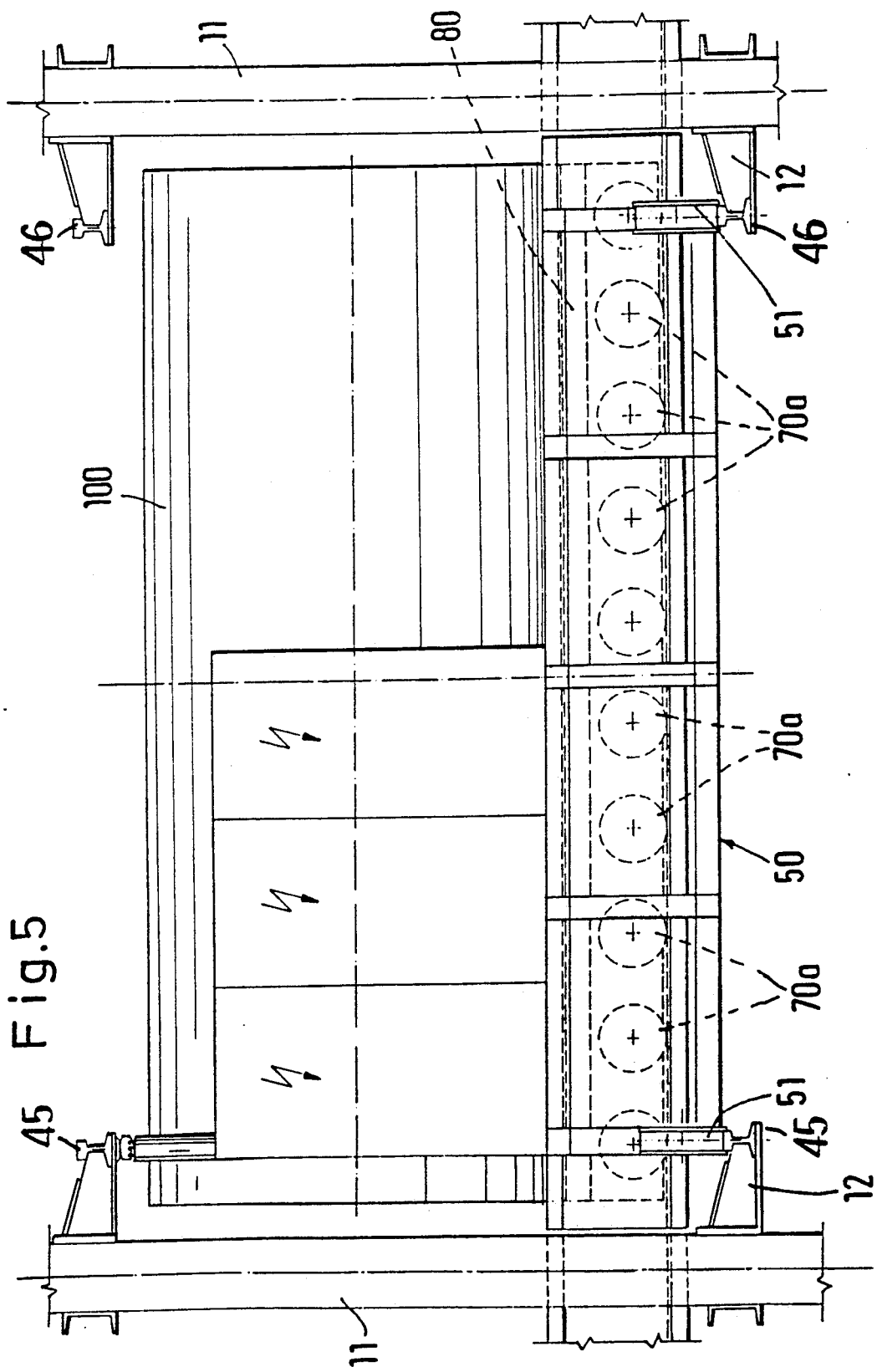
FIG. 5 shows, in a front view, the relocation car according to FIG. 4.

Each shelf portion 20,120 is made up of vertical shelf posts 11 that are interconnected by means of horizontal cross beams 12 so that, in the individual shelf portions 20,120, individual tiers 21,22,23,24,25 are formed. In the embodiment shown in FIGS. 1 and 2, each shelf portion 20,120 is provided with five tiers, in which case the number of tiers depends on the, in each case, desired or requisite storage capacity of the high bay racking store (FIG. 5). Since the high bay racking store 10 is assembled after the manner of the skeleton system of construction, the possibility exists of enlarging each shelf portion 20, 120 laterally or vertically if the available storage capacity were not to prove adequate and had to be expanded. In this case, the individual shelf portions 20,120 may be prefabricated in the form of structural members in order to be then disposed in a modular manner relative to one another and/or above each other. The frame structure forming the high bay racking store 10 is preferably mounted on a base plate.

Figure 6:
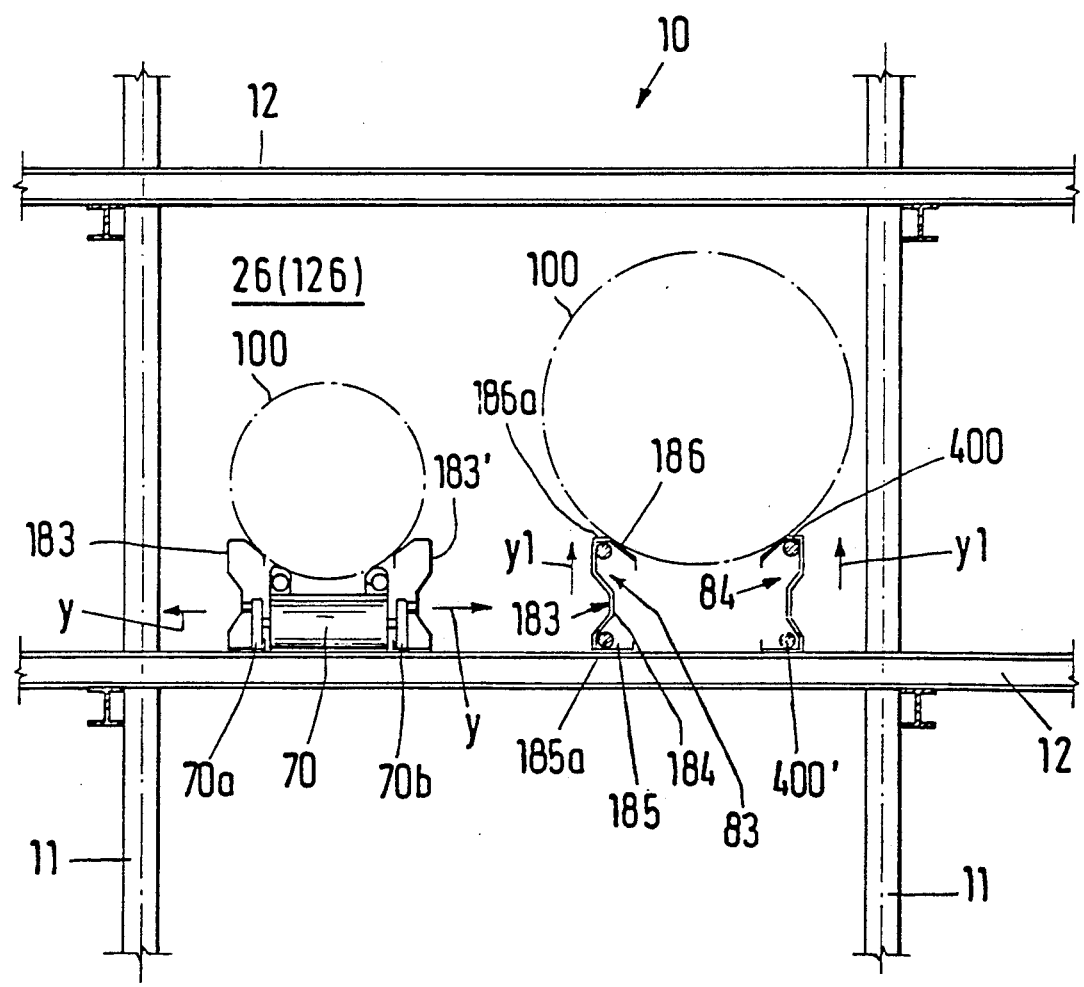
FIG. 6 shows, in a view from the front, a shelf compartment with two paper rolls stored therein.

The tiers 21 thru 25 of each shelf portion 20,120 are not staggered relative to each other, but the tiers of the two shelf portions are located in the same planes. The vertical shelf posts 11 are disposed so as to be spaced apart at intervals so that, in each of the two shelf portions 20,120, a plurality of shelf compartments arranged side by side as well as above each other is formed, which are identified with 26,126. The dimensions of the individual shelf compartments 26,126 which, with their front end apertures 26a, are allocated to the distribution well 30, are kept in such a way that one or several paper rolls lie parallel to the longitudinal direction of each shelf compartment 26,126. The height of each shelf compartment 26,126 depends on the diameter of the paper rolls 100 to be stored; the height of each shelf compartment 26,126 will preferably depend on the largest diameter of the paper rolls to be stored so that, in the end, it will also possible to store paper rolls having different diameters in each shelf compartment (FIG. 6).

According to the embodiment depicted in FIGS. 1 and 2, the high bay racking store 10 comprises two shelf portions 20,120 disposed on both sides of the distribution well 30. However, the possibility also exists of making a high bay racking store 10 which comprises one shelf portion 20 only, as appears from the FIG. 3. This high bay racking store 10 made up of only one shelf portion 20 is, as regards its shelf portion 20, constructed in conformity with the shelf portions 20,120 of the high bay racking store 10 shown in FIGS. 1 and 2.

The length of each shelf compartment 26,126 of the shelf portions 20,120 of the high bay racking store 10 corresponds to the multiple of the length of a paper roll 100, in which case, however, it is also possible for a shelf construction to be provided according to which each shelf compartment possesses a length that corresponds to the length of a paper roll 100. The shelf portions 20,120 disposed on both sides of the distribution well 30 are arranged so as to face each other in such a way that the front-end apertures 26a of the individual shelf compartments 26, 126 of the one shelf portion 20 correspond to those of the other shelf portion 120.

In each tier 21,22,23,24,25 of each shelf portion 20,120, within the area of the front-end apertures 26a, a conveying track running horizontally and transversely to the longitudinal direction of the shelf compartment for at least one relocation car 50, is disposed. In the embodiment shown in FIG. 3, one conveying track 40,41,42,43 each is allocated to the tiers 21,22,23,24. The conveying track necessary for the tier 25 is not shown in the drawing. The number of conveying tracks for these relocation cars 50 depends on the number of the individual tiers. If the high bay racking store 10 comprises solely one shelf portion 20 or 120, then the conveying tracks 40 thru 43 are disposed so as to extend as far as into the area of the front-end apertures 26a of the individual shelf compartments 26 or 126, respectively. If, on the other hand, the high bay racking store 10 is made up of the two shelf portions 20,120, in that case the conveying tracks 40 thru 43 are disposed in the distribution well 30 formed between the two shelf portions 20,120. Since no vertical displacement movements are executed within the area of the distribution well 30, the conveying tracks 40 thru 43 are rigidly connected to the frame structure of the high bay racking store 10.

Figure 3:
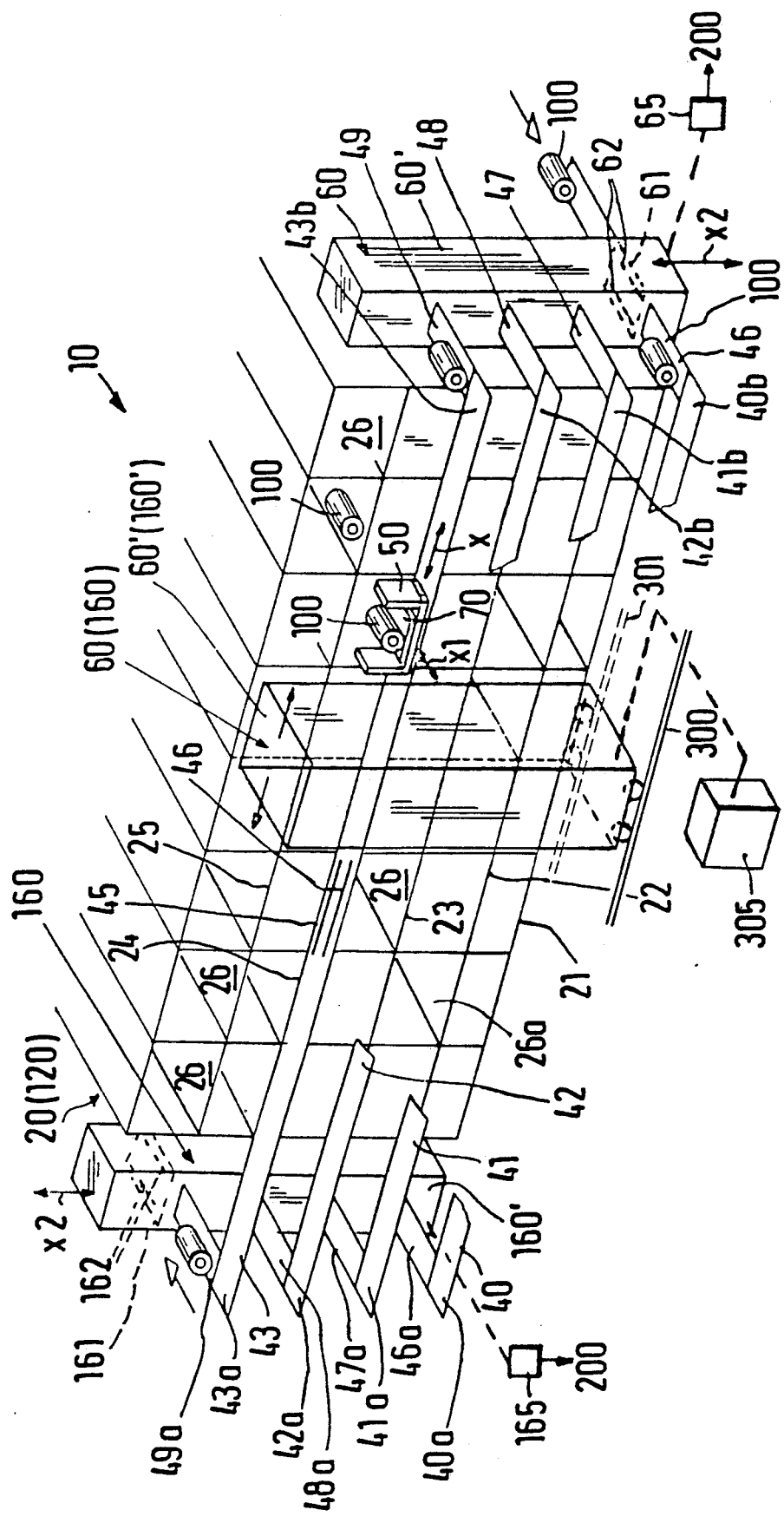
FIG. 3 shows, in a diagrammatical view, a high bay racking store comprising one shelf portion only.

Each conveying track 40,41,42,43 is provided with running tracks 45,46 laid parallel to each other for guiding the relocation cars 50 (FIG. 3).

In the embodiment illustrated in FIG. 3, the conveying tracks 40 thru 43 terminate with their two ends 40a,41a,42a,43a and 40b,41b,42b,43b in elevators 60,160, of which each elevator is made up of an elevator well 60',160', of a frame structure with a raisable and lowerable conveying platform 61,161, while each conveying platform 61,161 is constructed in such a way that the same is capable of accommodating at least one relocation car 50. For this purpose, each conveying platform 61,161 is likewise provided with a pair of running tracks 62,162 for accommodating the relocation cars 50, in which case, however, the running tracks 62,162 of each conveying platform 61,161 can be brought to connect with the running tracks 45,46 of each conveying track 40,41,42,43 in such a way that the relocation cars 50 can be made to travel from the conveying tracks onto the conveying platform 61,161 of the elevators 60,160 when the conveying platform has traveled into the area of the individual conveying tracks 40 thru 43 so that a continuous relocation car crossing area is obtained. However, each conveying platform 61,161 may have a length which corresponds to the multiple of the length of a relocation car 50 so that e.g. each conveying platform 61,161 is capable of accommodating two or several relocation cars 50 standing behind each other in order to be able to supply the relocation cars 50 to the conveying tracks 40 thru 43 of the individual racking store tiers 21 thru 25. The supply of the paper rolls 100 to the elevators 60,160 is effected by means of conveyer belts 210 (FIG. 1).

According to FIG. 3, the two elevators 60,160 are installed on the front end of the shelf portion 20. If the high bay racking store 10 comprises two shelf portions 20,120, in that case the possibility exists of disposing the elevators 60,160 at the ends of the distribution well 30, it being possible, however, to select also other locations for the elevators 60,160. If the elevators 60,160 are disposed on the front-end sides of the shelf portion 20 (FIG. 1), then the conveying tracks 40 thru 43 are extended as far as into the front-end sides of the shelf portion 20 and terminate in the elevators 60,160 disposed on the front-end sides of the shelf portion 20. In this case, a construction of these conveying tracks 40 thru 43 may be carried out in such a way that the relocation cars 50 can also be accomodated by the conveying platforms 61,161 of the two elevators 60, 160. However, according to a further embodiment, the conveying tracks 40 thru 43 running within the area of the front-end apertures 26a of the shelf compartments 26,126 of the shelf portions 20,120 serve for the travel of the relocation cars 50, whereas those conveying track sections which run within the area of the front ends of the shelf portion 20, then serve as conveying track for paper roll trolleys 70 which can be mounted upon the individual relocation cars 50, to which reference will yet be made in the following. The conveying track sections running within the area of the front ends of the shelf portion 20 are identified with 46,47,48,49 and with 46a,47a,48a,49a (FIG. 3).

The vertical travel of the conveying platforms 61,161 of the two elevators 60,160 is preferably effected with the aid of electromotively operated driving means which are indicated at 65,165. The direction of travel of the two conveying platforms 61,161 takes place in the direction of the arrows X2 (FIG. 3). However, the possibility also exists, in lieu of two elevators 60,160 disposed at the front end of the shelf portion 20, of providing a single elevator into which the conveying tracks 40 thru 43 then terminate with or without their conveying track sections 46 thru 49 and 46a thru 49a.

Figure 4:
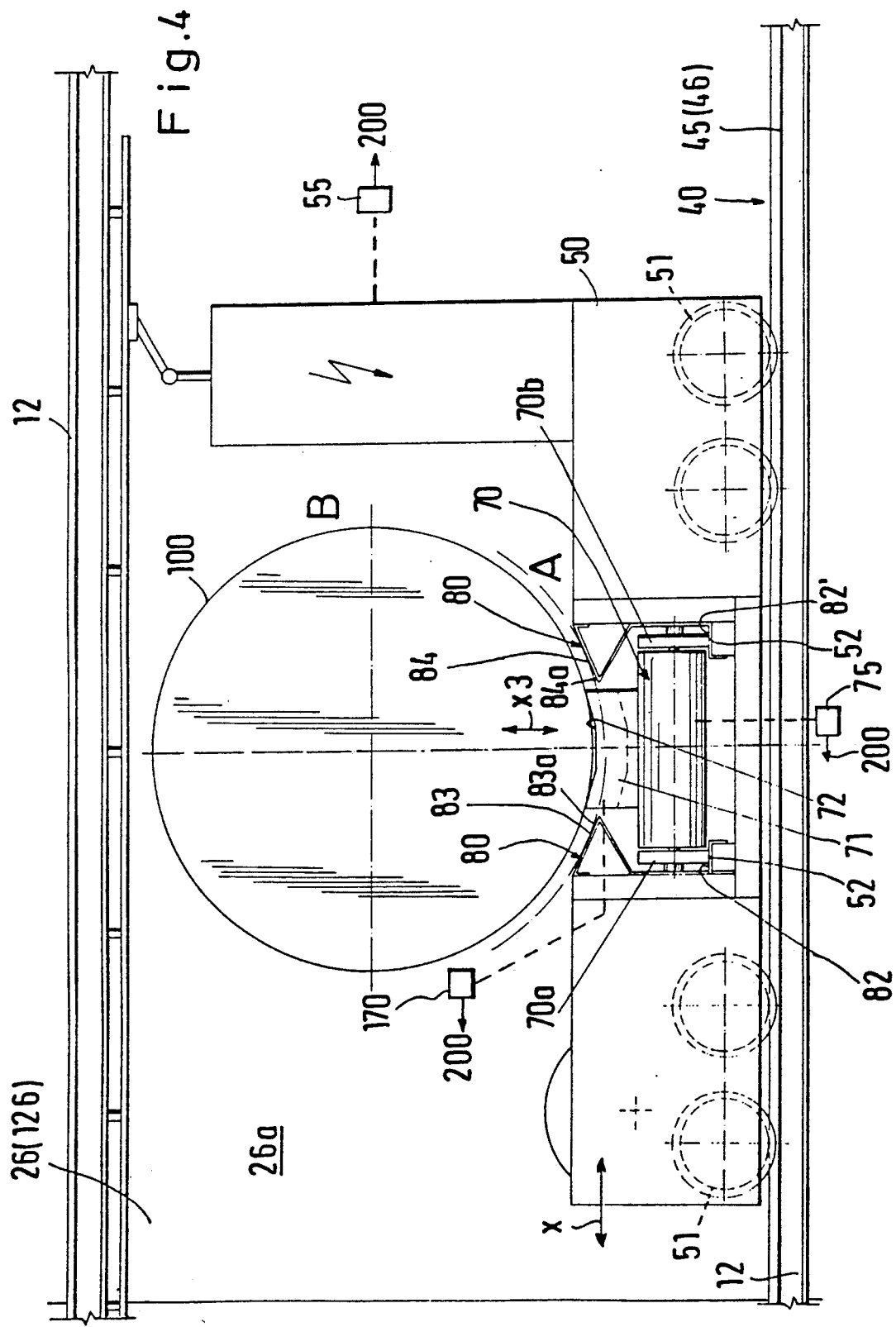
FIG. 4 shows, in an enlarged side view, a relocation car with a paper roll trolley carrying a paper roll mounted thereupon.

Each relocation car 50 is provided with a paper roll trolley 70 travelling transversely to the advance movement of the relocation car, which is disposed on the relocation car 50 in a piggyback manner (FIG. 4). In order to obtain as low a constructional height as possible, the relocation car is centrally provided with a recess or depression in which the paper roll trolley comes to stand. Within the area of the location of the paper roll trolley 70, the relocation car 50 is provided with a pair of running tracks 52 on which the paper roll trolley 70 is supported with its runners 70a,70b and is guided in such a way that it is possible for the paper roll trolley 70 to travel in the direction of arrow X1 (FIGS. 3 and 5). The relocation car 50 itself is fitted with runners 51 in order to enable it to travel on the running tracks of the conveying tracks 40 thru 43.

The paper roll trolley 70 is provided with a raisable and lowerable paper roll supporting plate 71. The raising movement of said paper roll supporting plate 71 takes place in the direction of arrow X3 (FIG. 4). The driving means of the paper roll supporting plate 71 for the vertical displacement of the same is accommodated inside the casing of this paper roll trolley 70 and is identified with 170. Besides an electromotive drive, it is also possible to use a hydraulic lifting means. The driving means of the relocation car 50 is indicated at 55 and, the one for the paper roll trolley 70, at 75. All the driving means 55, 65,165,75 and 170 are combined in a programmed control unit 200 in which also the individual shelf compartments 26,126 are stored, which will be dealt with in greater detail in the following (FIG. 2).

The paper roll supporting plate 71 of the paper roll trolley 70 is provided with a bearing area 72 for the individual paper rolls 100 which is constructed in the form of a circular arc, i.e. constructed in such a way that the paper roll bearing area 72 adapts itself to the circumference of the paper roll 100 so that the same is securely retained in the depression formed by the paper roll bearing area 72 (FIG. 4).

Each shelf compartment 26,126 is provided with a paper roll support 80 extending in the longitudinal direction of the shelf compartment which is stationarily disposed within the frame structure of the high bay racking store. Said paper roll support 80 is provided with runway tracks 82,82' disposed on its two sides for the paper roll trolley 70. These two runway tracks 82 may be disposed on both sides of the paper roll support 80, but may also be included in the constructional design of the paper roll support 80, as is shown in the FIGS. 4 and 6.

The paper roll support 80 comprises two paper roll supporting rails 83,84 arranged so as to be spaced apart from each other, the supporting surfaces 83a,84a of which for the paper roll 100 are constructed so as to extend inclinedly toward each other so that a storage area is obtained which corresponds approximately to the course of a section of the circumference of a paper roll so that, by the two supporting surfaces 83a,84a, a bowl or trough-shaped storage area for the paper roll 100 is created, said roll being then held securely in position on the paper roll support 80.

In addition, the two paper roll supporting rails 83,84 of the paper roll support 80 are disposed at a distance from each other, this distance being dimensioned in such a way that the paper roll supporting plate 71 can be passed between the paper roll supporting rails 83,84 when the paper roll trolley 70 travels through the paper roll support 80 with raised supporting plate 71 (FIGS. 4 and 5). The conveying position of the paper roll 100 with raised paper roll supporting plate 71 of the paper roll trolley 70 is indicated at B in FIG. 4, while the mounted position of the paper roll support 80 in a shelf compartment is indicated at A.

By means of the relocation car 50 with mounted paper roll trolley 70, the individual paper roll 100 is conveyed on the conveying track of the respective shelf into the area of the front-end aperture 26a of that shelf compartment 26 or 126 of the shelf portion 20 or 120 in which the paper roll is to be deposited. Once the relocation car 50 has assumed the position shown in FIG. 4, then the paper roll trolley 70 with the paper roll 100 travels into the shelf compartment while the paper roll is raised by means of the paper roll supporting plate 71 so that it is possible for the paper roll to be moved above the paper roll support 80 disposed in the shelf compartment into its depositing position in the shelf compartment. When the paper roll trolley 70 has assumed the depositing location intended for the paper roll, then the paper roll support 80 is lowered, until the paper roll is seated upon the paper roll supporting rails 83,84 of the paper roll support 80. The paper roll trolley 70 is then moved with retracted paper roll supporting plate 71 into the area of the front-end aperture of the shelf compartment in question and passed on to the relocation car 50 which has been put in readiness in the interim, which is thus available for accepting a fresh paper roll.

The paper roll supports 80 in the individual shelf compartments 26,126 may extend over the entire length of the shelf compartments. However, the possibility also exists in the case of shelf compartments having very great lengths, to arrange shorter sections of the paper roll support 80 one behind the other in a row while maintaining the spacing intervals, and this in such a way that sufficient storage and supporting areas for the paper rolls are obtained. There also exists the possibility of only disposing in each individual shelf compartment 26,126 one paper roll support 80 or several paper roll supports 80 in a side-by-side arrangement. In the embodiment depicted in FIG. 5, two paper roll supports 80 are disposed in the shelf compartment. In this embodiment example, the paper roll supports 80 are constructed having different dimensions in order to be able to accommodate paper rolls having varying diameters.

Each paper roll supporting rail 83,84 is made up of a shaped sectional member 183 which is approximately U-shaped and a vertical web 184, a lower horizontal leg 185 and an upper, inclinedly configured leg 186. Both shaped sectional members 183 forming the paper roll supporting rails 83,84 are disposed in such a way with their legs 185,186 located opposite each other that the lower legs 185 which face each other, form the runway tracks 82 for the paper roll trolley 70, and that the upper legs 186 extending obliquely relative to each other, form the supporting surfaces 83a,84a for the paper roll 100 (FIG. 5). Advantageously, the two equally configured sectional members 183,183' are designed in such a way that their reciprocal distance is variable in the direction of arrow Y. To this is added the circumstance that each shaped sectional member 183,183' may be constructed so as to be divided in two, in which case the, in each case, upper part of each shaped sectional member 183,183' then is upwardly displaceable in the direction of arrow Y1 so that the basic dimensions of the shaped sectional members 183,183' can be modified in such a way that it is possible also for paper rolls 100 having a larger diameter to be securely stored and held in position on the paper roll support 80. The paper roll supporting rails 83,84 or the shaped sectional members 183,183' may also be constructed in a different way.

Both the relocation car 50 and the paper roll trolley 70 are equipped with an electromotively operated driving motor; however, also differently constructed driving means may be employed.

The high bay racking store 10 is used in the manner described below:

If a paper roll 100 is to be stored in the vacant shelf compartment 26 in the tier 24 of the shelf portion 20 of the high bay racking store 10, then this paper roll is, in accordance with FIG. 1, supplied by means of a system of conveyer belts or the like inserted in front, from the position A to the conveying track 210. In the position C, within the area of the conveying track 210, a relocation car 50 with mounted paper roll trolley 70 stands in readiness, and this in such a way that the paper roll can be supplied from the position B directly to the paper roll supporting plate 71 of the paper roll trolley 70. In the process, the paper roll supporting plate 71 of the paper roll trolley 70 assumes by preference its lowest position so that a perfect transfer of the paper roll is ensured. If this paper roll is to be supplied on the paper roll trolley 70 to a shelf compartment in tier 21, then the relocation car 50 travels in the direction of arrow Z on the lowermost conveying track 40 as far as into the area of shelf compartment 26, in which the paper roll is to be deposited. However, since in the example quoted here the paper roll 100 is to be supplied into the shelf compartment 26 of the tier 24, the paper roll, lying on the paper roll trolley 70, is supplied together with the latter to the conveying platform 61 of elevator 60 and, with the aid of the elevator, is conveyed to tier 24 and is then moved on to the conveying track section 49 to the conveying track 43, on which a relocation car 50 is available for taking over the paper roll trolley 70. After having taken over the paper roll trolley 70, the relocation car 50 is displaced in the direction of arrow Z1 on the conveying track 43 into the area of the front-end aperture 26a of that shelf compartment 26, in which the paper roll 100 is intended to be deposited. The relocation car 50 has then reached its terminal travel position within the area of this shelf compartment and remains there until the paper roll trolley 70 has traveled into the shelf compartment. For moving the paper roll trolley 70 into the shelf compartment, the paper roll supporting plate 71 is raised together with the paper roll disposed on the same, whereupon the paper roll trolley 70 then slides into the shelf compartment and is moved forward until it reaches the position in which the paper roll is deposited on the paper roll support 80. The paper roll supporting plate 71 of the paper roll trolley 70 is then lowered while, at the same time, the paper roll is placed upon the two paper roll supporting rails. With retracted paper roll supporting plate 71, the paper roll trolley 70 is then moved into the exit area of this shelf compartment and is received by a relocation car which has been made available and is moved once more into the lowermost loading position so as to be able to take up a fresh paper roll. In the same manner in which the charging of the individual shelf compartments is effected, the removal of the paper rolls from the high bay racking store is also carried out.

The conveying of the paper rolls 100 can, after they have been accommodated on the paper roll trolleys 70, take place as far as into the area of the conveying tracks 40 thru 43 without relocation cars 50. Only when the paper roll trolleys 70 with the paper rolls 100 have reached the conveying tracks 40 thru 43, a takeover of the paper roll trolleys 70 by the relocation cars 50 takes place, starting from which the paper roll trolleys 70 are moved into the individual shelf compartments 26,126. However, in order to be able to deposit the paper rolls, there also exists the possibility of moving, from the paper roll dispatch station, the paper rolls disposed on the paper roll trolleys 70 together with the paper roll distributor car 50 as far as into the area of the shelf compartments.

The elevator well 60',160' allocated to the shelf portions 20, 120 is stationarily disposed on the one end of the conveying tracks 40 thru 43. In order to be able to give the distribution well 30 as small a width as possible, the elevator well 60', 160' is disposed laterally in front of the distribution well 30, while the conveying tracks 40 thru 43 running in front of the shelf portions 20,120 are passed into the elevator well 60', 160' across conveyer tracks 46 thru 49 running transversely to the latter. However, there also exists the possibility of disposing the elevator well 60',160' inside or in front of the distribution well 30, in which case the elevator well 60',160' can be constructed so as to be stationary or displaceable. In the latter case, the travel in the distribution well 30 between the two oppositely located shelf portions 20,120 can take place in the longitudinal direction of the shelf on runway tracks 300, 301 with the aid of electromotive driving means indicated at 305 (FIG. 3). It is also possible for the elevator well 60',160' to be constructed so as to be automatically displaceable so that a travelling out of the shelf area is also possible. In those embodiments in which the elevator well 60',160' is displaceable in the distribution well 30 in the longitudinal direction of the shelves, no conveying tracks 40 thru 43 are provided in the distribution well 30 so as to enable the elevator well 60', 160' to travel freely.

The advantage when using an elevator well 60',160' which is disposed so as to be displaceable in the distribution well 30 and which has a height corresponding to that of the shelf portions 20,120, resides in a gentle conveying of the paper rolls. When employing continuous conveyers in the form of conveying belts or tracks 40 thru 43 in front of the two shelf portions, when goods are conveyed, the entire track or belt has always to be put in operation. Added to this is the repeated handing over of the paper rolls and a possible or even necessary intermediate storage. This is dispensed with here. The paper rolls are placed on the trolley once and, when arrived at the destination, deposited.

The paper roll supporting rails 83,84 according to the embodiment shown in FIG. 4 possess freely projecting paper roll resting legs 186 which, due to their freely projecting construction, have a certain springiness. Within the main load areas, thus within the connection areas of the paper roll resting legs, 186 with the vertical webs 184 or within the connection areas of the vertical webs 184 with the horizontal legs 185, a high material stress occurs which results from the heavy weight of the paper rolls having to be accommodated. For this reason, within these connection areas, and this on the inside, bracing sections 400 or 400' are provided in the longitudinal direction of the paper roll supporting rails, said sections possess a cross-sectional contour having the shape of a circular arc (FIG. 6). Said bracing sections 400,400' are conducive to an increase in the stability and the breaking strength without the elasticity of the paper roll resting legs 186 being impaired thereby. Moreover, the bracing sections 400,400' may also be constructed in tubular form. Furthermore, the bracing sections 400,400' can also be employed in the form of outwardly protected current collectors for the driving motors of the paper roll trolleys 70.

Figure 7:
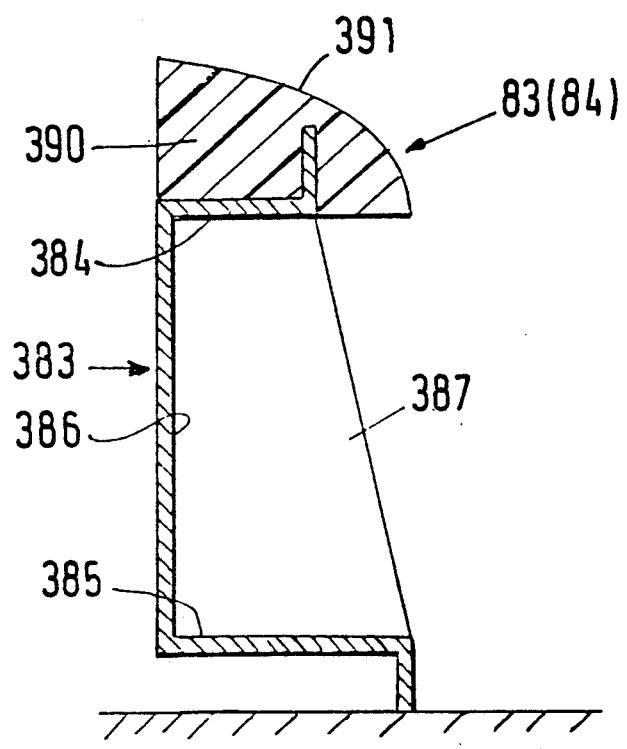
FIG. 7 shows, in a vertical section, a further embodiment of a paper roll supporting track.

According to FIG. 7, each paper roll supporting rail 83,84 is made up of a U-shaped sectional member 383, while the aperture 386 formed by the, in each case, upper sectional leg 384 and the, in each case, lower sectional leg 385 of the two sectional members are disposed so as to be located opposite each other. The upper sectional member leg 384 supports a shaped member 390 possessing an arcuately extending paper roll supporting surface 391, said shaped member being fabricated from wood or plastic material. The shaped member 390 possesses a cross-section having the shape of a right-angled triangle, the basic area 391 of which extends in an arcuate fashion so that the basic areas of the shaped members 390 of the two paper roll supporting rails 83,84 extend so as to be inclined toward each other. Additional bracings between the two sectional member legs 384,385 are inducinve to increasing the stability of the paper roll supporting rails. It is also possible for the paper roll supporting area 391 to be constructed in the form of an inwardly narrowed arcuate section.

The use of paper roll supporting rails 83,84 with shaped members 390 of wood or plastic as support for the paper rolls results in the advantage that simple structures can be used for the supporting rails. Shaped members 390 that are worn or damaged in the course of time are readily interchangeable with new ones. Added to this is the circumstance that shaped members 390 with the most widely varying dimensions of their cross-sections can be used when the angle of the supporting area of the paper rolls is to be changed and when the distance of the paper roll supporting rails 83,84 is not variable.

FIG. 8 shows an overall view of an installation which comprises a high bay racking store 10 with supply tracks 500 for the paper rolls 100. It will have to be taken into consideration in this connection that the incidence of paper rolls to be handled in the most unfavorable circumstances will have to be conveyed in the form of a single roll into the high bay racking store 10. If the rolls are to be shipped, in that case it may be possible for the rolls to be combined into transport units which should not exceed a packing length of 3.20 m.

The conveying from the paper mill to the high bay racking store 10 is carried out by paper roll transfer trucks 510 running independently of each other. These are transfer trucks with their own power drive and controlling means which travel in double floor tracks 501,502 (FIGS. 10 and 11). In the lower level E1, the transfer trucks travel as an empty vehicle on the return trip and in the upper level E2 as a loaded vehicle. After the unloading of the transfer truck, the same is transferred from the upper to the lower level at a point favorable to the material flow by means of a lifting or hoisting station and is then able to travel back in the opposite direction. It is ensured hereby that the transfer trucks 510 are employed in permanent roundabout traffic according to source-target function and the respective frequency. The supply tracks for the paper rolls are preferably constructed in the form of conveying bridges (FIG. 10).

Heights are bridged over by means of a vertical conveyer 515 so that the paper rolls, after having been hoisted onto the conveying trolleys, are only moved agin in the high bay racking store.

The entire conveying route is supplied by e.g. thirteen transfer trucks 510, it being assumed here that rolls which are intended for the high bay racking store, are moved in the form of single rolls. Transfer trucks which supply the high bay racking store are shifted directly at the storing points so as to be quickly ready again for receiving a fresh roll.

If the rolls are intended for shipment, then the maximum loading unit a transfer truck is capable of carrying is conveyed.

Since, parallel to this, the guillotine devices 520 still have to be supplied with paper rolls, additional transfer trucks are required. The conveying of rolls within the storage and the storage-removal area is likewise effected by transfer trucks stationarily disposed in the vertical conveyer. The storing and the removal from the store of the paper rolls in the high bay racking store is carried out by means of conveying truck and satellite which are equipped with their own controlling means.

The overall installation is operated as detailed below: The rolls coming out from the roll cutting means 520 are passed on to an intermittently moved carriage by means of the roll depositing station 521. The rolls are separated by two movable hoisting beams acting independently of each other. Each hoisting beam is equipped with roll retaining means in order to secure the rolls to be separated against slipping out of position. Hereby it is possible to intermittently move, mark and eject individual rolls or to individually marked and to be again combined into loading units of a maximal length of 3.20 m. In individual rolls, the stamping is done on the front-end side (in the conveying direction). In the case of loading units to be intermittently moved, one roll/intermittent move is stamped on the front and another roll on the rear.

Once a loading unit is assembled, it is tipped from the intermittently travelling carriage onto a relocation truck 522 with tipping means and catcher. The same travels in the direction of arrow Z to the conveying truck traveling route and passes the roll onto the conveying truck loading gauge and loading gauge hoisting station, which is indicated at 523. Here the conveying truck travels underneath the roll, picks up the same with its hoisting gear and travels on the upper track 501 to the predetermined destination (FIG. 11).

The roll cutting means 520,520' have the same device. In the conveying route leading to the roll cutting means 520', a turntable 540 is provided which compensates the angle balance of approximately 6° between paper mill and equipment/high bay racking store and which also, at the same time, is provided with means for the later connection of the conveying route to the further roll cutting means (FIG. 8).

The paper rolls coming from the roll cutting means 520,520' are, with the aid of an ejector 560, via the runway 561 with stpppers and rolling aids, rolled into a hoisting station 562 in which a conveying truck 510 is standing. From this station, the roll can be either tipped with the aid of the tipping means onto the running track leading further into the sectional travel members in front of the vertical conveyer 563 constructed in the form of a catcher or be lifted into the conveying truck by means of hydraulic devices.

The conveying truck travels in the double-floor running sections (FIG. 11) on the upper level E1 in front of the runway track 554. Here the roll is handed over with the ejector 565 via the runway track with stopper into the traveling sections constructed in the form of catchers in front of the vertical conveyer 569. The conveying truck is now lifted in the hoisting station onto the lower travelling section level and travels back to the hoisting station 562, here it is again raised into the upper level with the aid of the hoisting station and is able to once more accept new rolls. Two conveying tracks are involved in this circulation (FIG. 8).

The platform of the vertical conveyer 563 travels in front of the extended traveling section of the runway track. The conveying truck located on the platform travels outwardly and underneath the roll, raises its platform and thus takes over the roll; it then travels back to the vertical conveyer which now moves into the level predetermined by the computer. The conveying truck picks up the roll again, travels into the traveling section 566 and puts the roll down onto the section. This traveling and supporting section serves as stowage point. The conveying truck moves back into the vertical conveyer and takes over the next roll in the storage level.

The same functions may also be traveled with the runway track 564, the vertical conveyer 569, with the conveying truck and the stowage point 567.

The relocation car 50 with the paper roll trolley 70 now moves in front of the stowage point, the paper roll trolley travels underneath the roll, raises it and travels back to the relocation car; here the roll is put down onto the travelling and supporting section of the relocation car during the traveling. The relocation car now travels in front of the channel predetermined by the computer, the paper roll trolley picks the roll up again and travels into the store channel. Here it deposits the roll on the spot predetermined by the computer and then travels back onto the relocation car.

The removal from storage of paper rolls is effected in such a way that the relocation car 50 with the paper roll trolley 70 moves in front of the shelf channel predetermined by the computer; the paper roll trolley 70 moves into the lane, raises its platform after reaching the storage site and thus takes over the paper roll, travels back to the relocation car and puts the roll down on the supporting sections of the relocation car. The relocation car travels on tracks to a stowage point 670 in front of the vertical conveyer 60. The paper roll trolley picks up the roll, travels into the traveling and supporting section, puts down the roll and returns to the relocation car. The same now travels to the next shelf channel or to a vertical storage conveyer in order to pick up a fresh roll.

The vertical conveyer 60 now travels into the same level, the trolley 70 of the vertical conveyer moves into the section, lifts the roll and travels back into the vertical conveyer. The latter now moves into the storage level, there the conveying truck 500 moves with the roll into the travelling section 671 and puts the roll down. In this traveling section a conveying truck 500 is moving which now takes over the roll, then travels into the traveling and supporting section of the turntable 540 and deposits it there. The conveying truck 500 travels back into the travelling section.

The rearrangement of paper rolls within one level is possible with the aid of the relocation cars 50 and the paper rolls and the paper roll trolleys 70.

What is claimed is:

1. High bay racking store for the storing and removing from storage goods in the form of rolls, more particularly paper rolls, which, in a lying position, from a roll packing machine, can be supplied via a conveying route to the high bay racking store with shelf compartments provided in tiers, comprising:

a) at least one shelf portion (20, 120) having a plurality of shelf compartments (26, 126) disposed in tiers (21, 22, 23, 24, 25) in a side-by-side arrangement and having apertures (26a) located on a front-end side, each of the shelf compartments having a length corresponding to at least the length of a paper roll (100);

b) in each tier (21; 22; 23; 24; 25) of the shelf portion (20; 120), near the front-end apertures (26a) of each shelf compartment (26, 126), a horizontal conveying track (40; 41; 42; 43) extending transversely to the longitudinal direction of the shelves intended for the relocation cars (50) is disposed, all the conveying tracks (40 thru 43) having two ends at least one end of which (40a, 41a, 42a, 43a; 40b, 41b, 42b, 43b) terminates in an elevator (60; 160) having a frame structure with a raisable and lowerable conveying platform (61; 161) for accommodating at least one relocation car (50) with a paper roll trolley (70) mounted thereon;

c) the conveying tracks (40 thru 43) and the conveying platform (61, 161) of each elevator (60, 160) having first runway tracks (45, 46) and second runway tracks (62, 162), respectively, for the paper roll trolleys (70), the second runway tracks (62, 162) of each conveying platform (61; 161) form together with the first runway tracks (45, 46) of each conveying track (40; 41; 42; 42), in a respective tier position on the conveying platforms (61; 162), a continuous relocation car crossing area;

d) the paper roll trolley (70) on each relocation car being able to travel transversely to a forward movement direction of the relocation car along third runway tracks (52) provided in the relocation car (50), and which trolley (70) is equipped with a raisable and lowerable paper roll supporting plate (71) with an approximately circular arc-shaped paper roll supporting surface (72);

e) each shelf compartment (26, 126) is provided with a stationary paper roll supporting beam (80) extending in a longitudinal direction of the shelf compartment with running tracks (82, 82') arranged on both sides of said paper roll supporting beam (80) for the paper roll trolley (70), the paper roll supporting beam (80) having two paper roll supporting rails (83, 84) arranged at a distance from each other, the supporting rails having supporting surfaces (83a, 84a) constructed so as to extend in a sloped manner toward each other so that a storage surface corresponding to a partial circumference of a paper roll is formed, the supporting surfaces being spaced from each other so that the paper roll trolley (70) is movable between the paper roll supporting rails (83, 84) when the paper roll supporting plate (71) is in a raised position; and f) driving means (65; 165; 55; 75) for moving the conveying platforms (61, 161) of the elevators (60, 160), the relocation cars (50) and the paper roll trolleys (70), the driving means including one programmed control unit (200) for controlling all movement.

2. High bay racking store according to claim 1, wherein the elevator well (60'; 160) is disposed laterally to the conveying tracks (40–43), while the conveying tracks (40 thru 43) running in front of the shelf portions (20; 120) are passed via conveying belts (46 thru 49) running transversely to the conveying tracks (40–43) into the elevator well (60'; 160).

3. High bay racking store according to claim 1, wherein each of the paper roll supporting rails (83; 84) is a U-shaped profile member (383) having an upper sectional leg (384) and a lower sectional leg (385) which form an aperture (386), both profile members being disposed so that their respective apertures are located opposite each other, the upper shaped sectional leg (384) carries a shaped member (390) having a paper roll supporting surface (391) which extends in an arcuate manner.

4. High bay racking store according to claim 3, wherein the shaped member (390) has a cross-section with an approximately right-angled triangle form, triangle cross-section having a base which is the paper roll supporting surface (391) that extends in an arcuate fashion so that the surface base surfaces of the shaped members (390) of the two paper roll supporting rails (83; 84) are inclined relative to each other.

5. High bay racking store according to claim 3, wherein the profile member (383) has bracing struts (387) extending vertically spaced apart from each other and connecting the upper and lower sectional legs (384, 285).

6. High bay racking store according to claim 3, wherein the shaped member (390) is made of wood.

7. High bay racking store according to claim 3, wherein the shaped member (390) is made of plastic.

8. High bay racking store according to claim 1, and further comprising supply tracks (500) arranged in front of the high bay racking store (10) with automatically traveling paper roll conveying tracks (510) that are displaceable on said tracks, each supply track is constructed in two floors with superimposed conveying routes (511, 512) for the paper roll conveying trucks (510), and each supply track (500) terminates in the elevator well (60'; 160') of the high bay racking store (10), vertical conveyers (515) being disposed in the supply track (500) for bridging over any variations in height, the supply track (500) interacts with paper roll cutting devices (520), roll packing machines (530) as well as with turntables (540).

9. High bay racking store according to claim 1, wherein at least two shelf portions (20, 120) are provided.

10. High bay racking store for storing roll-shaped goods, especially paper rolls, and for removing the rolls from storage, which rolls are supplied in a horizontal lying position from a roll packing machine along a conveying route to the high bay racking store with shelf compartments provided in tiers, comprising:

(a) two shelf portions (20, 120) spaced apart from each other so as to form a distribution well (30), the shelf portions having a plurality of shelf compartments (26, 126) disposed in tiers (21, 22, 23, 24, 25) in a side-by-side arrangement, the shelf compartments having end face apertures (26a) located on a side of the compartments facing the distribution well (30), the shelf compartments further having a length corresponding to at least a length of a paper roll (100), individual tiers (21–25) of a first of the two shelf portions (20, 120) being disposed on a first side of the distribution well (30) so as to be located opposite tiers of a second of the shelf portions located on a second side of the distribution well;

(b) a horizontal conveying track (40, 41, 42, 43) extending transversely to a longitudinal direction of the shelves and being arranged in each tier (21–25) of each shelf portion (20, 120) near the end face apertures (26a) of each shelf compartment (26, 126);

(c) movable relocation cars (50) provided in front of the end face apertures of the shelf compartments so as to move the paper rolls along the conveying route, each relocation car (50) having a paper roll trolley (70) mountable thereon and means for elevating the paper rolls, and being movable into and out of the shelf compartments, all of the conveying tracks (40–43) having two ends (40a, 41a, 42a, 43a, 40b, 41b, 42b, 43b) which each terminate at an elevator (60, 160) which has a stationary elevator well of a frame design and a raisable and lowerable conveying platform (61, 161) for accommodating at least one relocation car (50) with a paper roll trolley (70) mounted thereon;

(d) the conveying tracks (40, 43) and the conveying platform (61, 161) of each elevator (60, 160) having first runway tracks (45, 46) and second runway tracks (62, 162), respectively, for the paper roll trolley (70), the second runway tracks (62, 162) of each conveying platform (61, 161) forming together with the first runway tracks (45, 46) of each conveying track (40-43) a continuous relocation car crossing area in a respective tier position of the conveying platform (61, 161);

(e) the paper roll trolley (70) on relocation car (50) being able to travel transversely to a forward movement direction of the relocation car along third runway tracks (52) provided in the relocation car (50), the paper roll trolley having a raisable and lowerable paper roll supporting plate with an appropriately circular arc-shaped paper roll supporting surface (72);

(f) a stationary paper roll supporting beam (80) provided in each shelf compartment (26, 126) so as to extend in the longitudinal direction of the shelf compartment;

(g) running tracks (82, 82') for the paper roll trolley (70) being arranged in each shelf compartment (26, 126) on both sides of the paper roll supporting beam (80), the paper roll supporting beam (80) having two paper roll supporting rails (83, 84) arranged at a distance from each other, the supporting rails (83, 84) having supporting surfaces (83a, 84a) constructed so as to extend in a sloped manner toward each other so that a storage surface corresponding to a partial circumference of a paper roll is formed, the supporting surfaces being spaced from each other so that the paper roll trolley (70) is movable between the paper roll supporting rails (83, 84) when the paper roll supporting plate (71) is in a raised position;

(h) each of the paper roll supporting rails (83, 84) includes a profile member (183, 183') which is approximately U-shaped with a vertical web (184) and a lower horizontal leg (185) and an inclined upper leg (186), the profile members (183, 183') forming the paper roll supporting rails (83, 84) and being arranged so that the lower horizontal legs and upper legs (185, 186) lie opposite each other so that the lower legs form the running tracks (82, 82') for the paper roll trolley (70) and the upper legs (186) form the paper roll supporting surfaces (83a, 84a), the profile members (183, 183') which form the paper roll supporting rail (83, 84) being arranged so as to be movable so that a spacing between the members is changeable, each profile member (183, 183') also having an adjustable length; and (i) driving means (65, 165, 55, 75) for moving the conveying platform (61, 161) of the elevator (60, 160), the relocation cars (50) and the paper roll trolley (70), the driving means including one programmed control unit (200) for controlling all movement.

11. High bay racking store according to claim 10, wherein the distribution well (30), between the shelf portions (20, 120), has a width that corresponds to the length of a paper roll (100).

12. High bay racking store according to claim 10, wherein each relocation car (50) and each paper roll trolley (70) is equipped with an electromotively driven travel motor.

13. High bay racking store according to claim 10, wherein the elevator well (60'; 160) is disposed one of inside and in front of the distribution well (30).

14. High bay racking store according to claim 10, wherein the inclined upper leg (186) of each of the paper roll supporting rails (83; 84) is provided with sectional bracing means (400, 400') extending in a longitudinal direction of the paper roll supporting rails, the bracing means being arranged in at least one of a first connection area (186a) of the upper leg (186) and the vertical web (184), and a second connection area (185a) of the horizontal leg (185) and the vertical web (184), the bracing means being fastened on an inside surface of the profiled members and having a circularly shaped cross-sectional profile.

* * * * *